United States Patent
Yang (10) Patent No.: US 10,830,741 B1
(45) Date of Patent: Nov. 10, 2020

(54) COMBINED STRUCTURE OF UHV CHARACTERIZATION INSTRUMENT-INTERCONNECTED IN-SITU REACTION CELL AND BUILT-IN MASS SPECTROMETER ELECTRIC QUADRUPOLE

(71) Applicant: SHANGHAITECH UNIVERSITY, Shanghai (CN)

(72) Inventor: Yong Yang, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 16/966,017

(22) PCT Filed: Apr. 25, 2018

(86) PCT No.: PCT/CN2018/084398
§ 371 (c)(1),
(2) Date: Jul. 30, 2020

(87) PCT Pub. No.: WO2019/174108
PCT Pub. Date: Sep. 19, 2019

(30) Foreign Application Priority Data

Mar. 13, 2018 (CN) .......................... 2018 1 0206985

(51) Int. Cl.
*G01N 1/00* (2006.01)
*G01N 30/72* (2006.01)
*H01J 49/42* (2006.01)

(52) U.S. Cl.
CPC ...... *G01N 30/7206* (2013.01); *H01J 49/4215* (2013.01)

(58) Field of Classification Search
None
See application file for complete search history.

(56) References Cited

FOREIGN PATENT DOCUMENTS

| CN | 102612641 A | 7/2012 |
|---|---|---|
| CN | 104142364 A | 11/2014 |
| CN | 105702554 A | 6/2016 |

*Primary Examiner* — Jyoti Nagpaul
(74) *Attorney, Agent, or Firm* — Bayramoglu Law Offices LLC (57) ABSTRACT

A coupling structure of a UHV characterization instrument-interconnected in-situ reaction cell and a built-in mass spectrometer electro quadrupole is provided. One end of a stainless steel capillary is connected to a segregated in-situ reaction cell gas output pipeline, and the other end of the stainless steel capillary is a sampling port. A sampling gas flowing out of the sampling port is divided into two gas paths, wherein, one gas path enters a vacuum buffer chamber through a valve with a low flow control ratio, and the other gas path enters a mass spectrometer electro quadrupole through a valve with a high flow control ratio. When the mass spectrometer electro quadrupole performs sampling gas composition analysis on the interconnected in-situ reaction cell, its sampling time delay is negligible and the sampling analysis requirements for in-situ analysis of continuity, real-time and high time resolution are met.

9 Claims, 2 Drawing Sheets

COMBINED STRUCTURE OF UHV CHARACTERIZATION INSTRUMENT-INTERCONNECTED IN-SITU REACTION CELL AND BUILT-IN MASS SPECTROMETER ELECTRIC QUADRUPOLE

CROSS REFERENCE TO THE RELATED APPLICATIONS

This application is the national phase entry of International Application No. PCT/CN2018/084398, filed on Apr. 25, 2018, which is based upon and claims priority to Chinese Patent Application No. 201810206985.1, filed on Mar. 13, 2018, the entire contents of which are incorporated herein by reference.

TECHNICAL FIELD

The present invention relates to reaction control, kinetic characterization, composition detection and the coupling characterization with an ultra-high vacuum characterization instrument (abbreviated as UHV characterization instrument) for fundamental chemical reaction kinetics investigation of online treatments. The present invention is particularly focused on the following: an ultra-high vacuum characterization instrument provided with more than one vacuum molecular pump, for its sample pretreatment within its interconnected in-situ reaction cell, realizing its online composition analysis and characterization by extending and expanding function of the built-in mass spectrometer electro quadrupole on the ultra-high vacuum characterization instrument. In application, the present invention achieves simultaneous, real-time and continuous recording of the reaction gas composition in the environment where a research object is located during industrial condition preparation, thereby providing detailed preparation process information along with the accurate investigation as spectrum/microscopic imaging of the research object, and establishing the mutual relationship between the two. The present invention is also suitable for real-time and continuous detection of gas components in other similar environments, or can be used as a reference for an application scheme for directly interconnecting ultra-high vacuum characterization instruments other than the mass spectrometer electro quadrupole with a high-pressure environment.

BACKGROUND

The function of an in-situ reaction cell interconnected with an ultra-high vacuum device is to introduce a chemical reaction into the in-situ reaction cell, perform an in-situ pre-treatment on a sample, simulate a growth or reaction environment of materials by changing the temperature, pressure and gas component conditions of the reaction environment, and then perform spectral or microscopic imaging analysis directly by the ultra-high vacuum device through vacuum interconnection, thereby providing correlation data information between reaction conditions and sample behaviors. The main purpose of this treatment design is, namely, that its advantage, lies in the following: in the entire process from preparation to analysis, the samples are run under a customized ambient and vacuum protection, and are not subject to air contamination, thereby ensuring the direct correlation between the analysis results of the ultra-high vacuum device and the sample pre-treatment. At present, the vacuum interconnection of the ultra-high vacuum device and the in-situ reaction cell is an important upgrade option for large-scale instruments or devices, which can generally reach 10 bar (1 MPa) and 900° C.

The ultra-high vacuum spectroscopy or imaging characterization instruments, such as X-ray photoelectron spectroscopy (XPS), transmission electron microscope (TEM), scanning tunneling microscope (STM), high resolution energy electron energy loss spectrum (HREELS), low energy electron diffraction (LEED) and Auger electron spectroscopy (AES), have the advantages of high resolution and high sensitivity in characterization. However, the pressure range of ultra-high vacuum limits the applicable range of such types of instruments, and the general operation environment requires an pressure of $10^{-6}$ mbar or even lower. In a large part of the characterization work, it is necessary to simulate different conditions through the preparation process to study the corresponding reaction or growth environment that may affect the properties of the measured object, and reflect the properties in the measurement results of spectroscopy or imaging, thereby establishing a direct causal relationship between the preparation environment and the changes in the correlated properties of the measured object during the measurement process, and further deeply understanding important chemical reactions. The above preparation conditions are often above 1 bar, which greatly exceeds the operation conditions of the ultra-high vacuum characterization spectroscopy or imaging instruments.

By means of the independent in-situ reaction cell that can be interconnected with the vacuum, the preparation process under the above high-temperature and high-pressure conditions can be completed in the segregated in-situ reaction cell. After the preparation is completed, the pressure in the in-situ reaction cell is connected with a vacuum buffer chamber, and is reduced to a vacuum level equivalent to the ultra-high vacuum characterization part by an ultra high vacuum device such as a turbo molecular pump-mechanical pump set, and then the sample is transferred to the ultra-high vacuum characterization instrument through the vacuum interconnecting transfer device to complete the measurement and analysis. This is currently an important means to understand and improve representative chemical engineering reaction processes.

Due to the causal relationship between the preparation conditions and the measurement results, in the above measurement, the real-time accurate quantification of the composition of gas components in growth or reaction environment of the in-situ reaction cell and its corresponding time change is obviously crucial in the preparation process. However, the manufacturers that provide interconnection schemes do not support the gas composition analysis function which interconnected with the in-situ reaction cell, that is, they cannot provide a tracking verification corresponding to the ambient and vacuum protection during the process from preparation to characterization.

From the analysis of component control, the components of a reactant entering the in-situ reaction cell may be precisely controlled by a gas flow ratio, namely an input gas mixing device installed outside the instrument. However, the gas components are also bound to be changed along with the actual reaction process. For example, if the characteristics of a catalyst in a carbon monoxide oxidization process are observed, the reaction components before input are a precisely mixed gas of carbon monoxide and oxygen, but carbon dioxide will be produced in the in-situ reaction cell. If a sample produces carbonate-related signals during characterization, the corresponding in-situ data of components of the carbon dioxide gas in the preparation is crucial for discussion and argumentation. In addition, if the in-situ reaction cell is mixed with impurities due to an erroneous operation in the gas exposure control of the sample preparation process, it cannot be monitored without a device supporting the gas composition analysis function. Therefore, continuous real-time online components analysis must be performed in the in-situ reaction cell interconnected with the ultra-high vacuum spectroscopy or imaging instrument characterization if a causal relationship needs to be truly established between the reaction environment and the properties of the measurement object.

Figure 1:
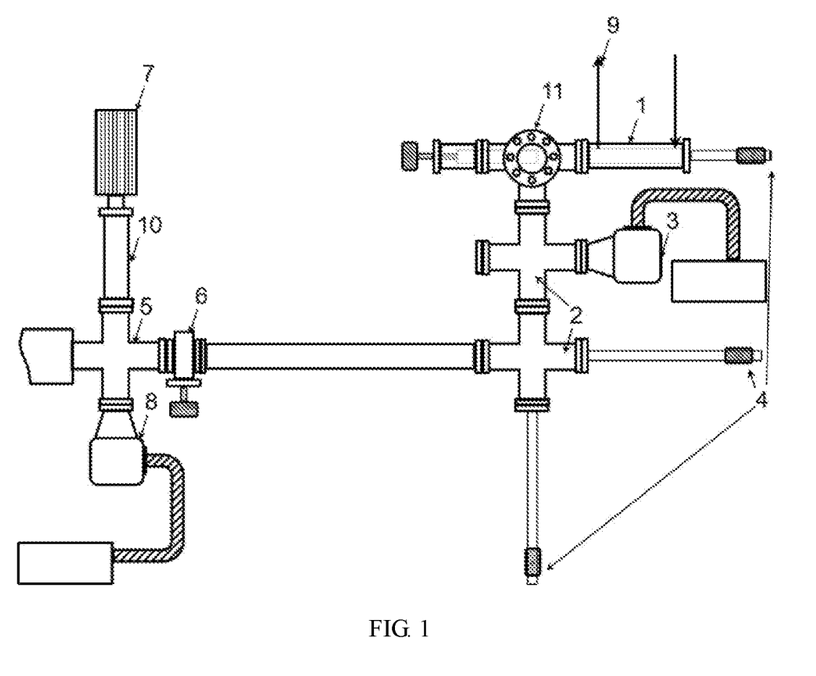
FIG. 1 is a schematic diagram of a layout structure in the prior art of an ultra-high vacuum characterization instrument interconnected with an in-situ reaction cell.

FIG. 1 shows the layout structure in the prior art and how the ultra-high vacuum characterization instrument and the in-situ reaction cell are interconnected. By means of the independent in-situ reaction cell 1 that can be interconnected with the vacuum, the preparation process at high temperature and high pressure conditions is separated from the ambient environment and is completed in the in-situ reaction cell. After the preparation is completed, the pressure in the independent in-situ reaction cell 1 connects with the vacuum buffer chamber 2, and is reduced to a vacuum level equivalent to the ultra-high vacuum characterization part through the $1^{st}$ turbo molecular pump-mechanical pump set 3 configured in the chamber, and then, a sample is transferred to a sample chamber 5 of the ultra-high vacuum characterization instrument through the vacuum interconnecting transfer device 4, and is ready to be further transferred to the main analysis chamber of the ultra-high vacuum characterization instrument to complete the characterization measurement. The vacuum buffer chamber 2 is segregated from the sample chamber 5 by the $1^{st}$ gate valve 6. In this way, the preparation process is exclusively completed in the independent in-situ reaction cell 1 and is segregated from the ultra-high vacuum characterization instrument. The sample chamber 5 connects with the mass spectrometer electro quadrupole 7 and is provided with the $2^{nd}$ turbo molecular pump-mechanical pump set 8.

The main technical problem in the modification of the layout structure shown in FIG. 1 is that the connection method of the mass spectrometer electro quadrupole built in the ultra-high vacuum characterization instrument is only suitable for detection of possible micro-leakage in the ultra-high vacuum characterization instrument or treatment of trace gas at the atomic level of the sample. Its corresponding pressure is in the range of $10^{-10}$ to $10^{-5}$ mbar, while the environmental parameters required by the online detection of the in-situ reaction cell need to reach 1 to 10 bar. Therefore, the modified mass spectrometer electro quadrupole should take into account the two different pressure ranges, that is, on the basis of the original range of $10^{-10}$ to $10^{-5}$ mbar, it further expands the operating range covering 1 to 10 bar.

In addition, during the design of the extension and expansion of the operation range of the mass spectrometer electro quadrupole for the ultra-high vacuum characterization instrument, the original operation structure of the ultra-high vacuum characterization instrument needs to be retained, that is, when the mass spectrometer electro quadrupole monitors the in-situ reaction cell online, all other functional parts of the ultra-high vacuum characterization instrument are still in normal operating conditions.

Therefore, the main problem of the above composition analysis is summarized as following: On the premise of not changing the operation structure of the UHV characterization equipment, the online real-time gas composition analysis of the in-situ reaction cell interconnected with the ultra-high vacuum characterization instrument is realized in the conditions of the operating pressure range from 1 to 10 bar and the temperature range from room temperature to 900° C. by extending and expanding the operation measurement range of the mass spectrometer electro quadrupole.

In addition, it should also be noted that the in-situ reaction cell for the X-ray apparatus generally has a pressure range from 1 bar to 10 bar, which belongs to the range of normal pressure to medium high pressure, and has exceeded the allowed upper limit of sampling pressure of a general gas composition analysis apparatus such as a gas chromatograph (GC) and a mass spectrometer (MS) on the market.

SUMMARY

An objective of the present invention is to customize a mass spectrometer sampling module scheme for an in-situ reaction cell vacuum-interconnected with an ultra-high vacuum characterization instrument, and provide accurate control of gas input of the reaction cell and online analysis of product components in the reaction.

In order to achieve the above objective, the technical solution of the present invention is to provide a coupling structure of a UHV characterization instrument-interconnected in-situ reaction cell and a built-in mass spectrometer electro quadrupole, including a independent in-situ reaction cell, wherein, an in-situ reaction cell gas output pipeline is connected to the independent in-situ reaction cell, and the independent in-situ reaction cell connects with a vacuum buffer chamber. A sample is transferred to a sample chamber of a UHV characterization instrument through a vacuum interconnecting transfer device, and the vacuum buffer chamber is segregated from the sample chamber by a $1^{st}$ gate valve. The sample chamber connects with a mass spectrometer electro quadrupole, and a $2^{nd}$ turbo molecular pump-mechanical pump set is installed on the sample chamber. One end of a stainless steel capillary pipeline is connected to the in-situ reaction cell gas output pipeline, and the other end of the stainless steel capillary pipeline is a sampling port. A sampling gas flowing out of the sampling port is divided into two gas paths, wherein, one gas path enters the vacuum buffer chamber through a valve with a low flow control ratio, and the other gas path enters the mass spectrometer electro quadrupole through a valve with a high flow control ratio.

Preferably, a flange with a viewport for monitoring sample transfer is connected between the vacuum buffer chamber and the independent in-situ reaction cell;

when the vacuum buffer chamber includes an idle flange port, the idle flange port is changed to a ferrule tube to flange adapter; and when the vacuum buffer chamber does not include an idle flange port, the flange with the viewport for monitoring sample transfer is replaced by a $2^{nd}$ tee flange, the flange with a viewport for monitoring sample transfer is installed on the straight-through direction of the $2^{nd}$ tee flange, the flange port in a non-straight-through direction of the second tee flange is an idle flange port, and the idle flange port is changed to a ferrule tube to flange adapter; and one gas path of the sampling gas enters the vacuum buffer chamber via the ferrule tube to flange adapter through the valve with the low flow control ratio.

Preferably, the valve with the low flow control ratio includes a bonnet needle valve.

Preferably, the valve with the high flow control ratio includes a high precision metering needle valve.

Preferably, the sampling port of the stainless steel capillary pipeline is connected to a protection ball valve.

Preferably, the coupling structure of the UHV characterization instrument-interconnected in-situ reaction cell and the built-in mass spectrometer electro quadrupole further includes a $1^{st}$ tee flange, wherein three flange ports of the $1^{st}$ tee flange are connected to the sample chamber, the mass spectrometer electro quadrupole and the valve with the high flow control ratio, respectively.

Preferably, the connection between one flange port of the $1^{st}$ tee flange to the valve with the high flow control ratio is segregated by a $2^{nd}$ gate valve.

Preferably, the ferrule tube to flange adapter, the stainless steel capillary pipeline, the protection ball valve, the valve with the low flow control ratio, the valve with the high flow control ratio, and the $2^{nd}$ gate valve all connect with each other to form an installation module.

Preferably, the stainless steel capillary pipeline performs a sampling on the in-situ reaction cell gas output pipeline, and is then directly adapted to a stainless steel pipeline with an amplified outer diameter of ¼ inch or larger.

Mass spectrometry has the characteristics of rapid response and high sensitivity to the gas composition change, and is an ideal means for monitoring the gas composition of in-situ reaction cell. In general, the ultra-high vacuum characterization instrument is provided with a mass spectrometer electro quadrupole connected to a sample chamber. In addition, a plurality of turbo molecular pump-mechanical pump sets are also provided. For example, a vacuum buffer chamber, a sample chamber and the like must be equipped with an independent turbo molecular pump-mechanical pump set. These devices are also the main hardware components for online detection of the mass spectrometer, and meet the basic hardware requirements of the solution of the inventor's granted patent No. ZL201610140435.5 (hereinafter referred to as the "prior patent solution") in China. The present invention combines the prior patent solution and the specific conditions of the ultra-high vacuum characterization instrument to directly use and reorganize and modify these hardware devices to do online gas composition detection for the reaction process in the in-situ reaction cell, saving the cost of the solution to the greatest extent.

The present invention refers to a solution for online high time resolution gas composition analysis using a mass spectrometer under a pressure environment of 0.1 to 2 MPa proposed by the applicant in the prior patent solution. On this basis, targeted structural adjustment is performed on the assembly and measurement scheme of the mass spectrometer according to a classified case of the ultra-high vacuum characterization instrument, to ensure that the mass spectrometer continuously measures the gas composition online in real time under the operating conditions of 1 bar to 10 bar in the in-situ reaction cell without changing the structure requirements to ensure the regular operation of the ultrahigh vacuum characterization instrument.

The solution proposed by the present invention is also suitable as a reference for an application solution for directly interconnecting an ultra-high vacuum characterization instrument other than the mass spectrometer electro quadrupole with a high-pressure environment.

The technical solution provided by the present invention solves the following technical problems:

Technical problem 1: the pressure range of online measure of the mass spectrometer electro quadrupole provided in the ultra-high vacuum characterization instrument is expanded to make its sampling pressure range further include the parameter range (1 to 10 bar) of the in-situ reaction cell. The in-situ reaction cell interconnected with the ultra-high vacuum characterization instrument reaches the upper limit pressure of 1 MPa during operation, which belongs to a medium high pressure range.

The general commercial ambient pressure mass spectrometers all require that the pressure in the sampling area is only 1 bar, i.e. 0.1 MPa, which can only partially meet the sampling needs. Even if the mass spectrometric analysis is limited to the in-situ reaction cell pressure of about 0.1 MPa, the use of a commercial ambient pressure mass spectrometer will also cause other restrictions and limitations. (i) Since the capillary of the commercial ambient pressure mass spectrometer are directly connected to the mass spectrometer, there will be a certain space limitation when the capillary is connected to the exhaust ports of the in-situ reaction cell, and the length of the in-situ reaction cell gas output pipeline outside the instrument needs to be further increased to facilitate the connection. This will cause a certain sampling time delay. (ii) In addition, the commercial ambient pressure mass spectrometer generally uses a relatively long glass fiber capillary, and its chromatographic effect itself will also further increase the above sampling time delay. (iii) The commercial ambient pressure mass spectrometer has a relatively large volume, and the installation at a position with the pipelines and wires dense arrangement near the ultra-high vacuum characterization instrument is easy to cause difficulties in layout and operation. Therefore, the use of commercial ambient pressure mass spectrometers has shortcomings in time delay and pressure adaptability.

The solution of the present invention adopts the prior patent solution, is directly applicable to the pressure range of 0.1 to 2 MPa, and fully meets the operating requirements of the in-situ reaction cell interconnected with the ultra-high vacuum characterization instrument in the pressure range. In the aspect of sampling time delay, the solution of the present invention has the following advantages over the commercial ambient pressure mass spectrometer. (i) Since the metal capillary is compatible with the universal ferrule installation, it is suitable for arranging a vacuum pipeline with a relatively large inner diameter such as a stainless steel pipeline of ¼ inch or larger to connect the capillary and the mass spectrometer. This part of the pipeline is already in a vacuum state when the mass spectrometer is tested, and the diameter of the pipeline ensures a relatively large flow conductance, so there will be no time delay due to the transportation of the sampling gas passing through the capillary. Moreover, it can also ensure that the capillary can be installed at the exhaust pipeline joint closest to the in-situ reaction cell. (ii) In addition, the delay time of the inlet diameter reduced metal capillary in the prior patent solution is negligible compared to the relatively long glass fiber capillary. (iii) Finally, as mentioned above, the solution of the present invention ensures that the metal capillary with a very small diameter and volume is directly connected to a sampling port at the shortest distance outside the ultra-high vacuum characterization instrument on the in-situ reaction cell gas output pipeline, and the time delay of the exhaust gas transmission is also already minimized. If a commercial ambient pressure mass spectrometer is used, because the volume of the instrument and the position of the capillary are constant relative to the mass spectrometer instrument, the length of the in-situ reaction cell gas output pipeline needs to be increased by about 1.5 m. For example, if a metal pipeline of 3 mm is used, and the inner diameter is about 1.5 mm, then a total internal volume of the pipeline is estimated to be 1.5 m×π×(1.5 mm)²/4, i.e., about 2 cm³. However, by means of the design of the solution of the present invention, the position of the capillary can be adjusted relative to the mass spectrometer electro quadrupole, the distance from the exhaust pipeline joint to the in-situ reaction cell is less than 7.5 cm, and the volume of the corresponding pipeline is only 0.1 cm$^3$. Generally speaking, the in-situ reaction cell of the ultra-high vacuum device is not a micro reaction cell, and its internal dead volume generally reaches 100 mL or more. Therefore, the volume of the above pipeline is much smaller than the dead volume of the in-situ reaction cell itself, and the resulting time delay is negligible. The time delay of the present invention is minimized compared to the commercial ambient pressure mass spectrometer by comprehensively optimizing the design advantages of the above parts. Therefore, compared with the current commercial instruments, the solution of the present invention has the measurement flexibility and accuracy advantages of the time delay and the pressure range of the sampling area, which are two measurement indexes closely related to the in-situ reaction cell interconnected with the ultra-high vacuum characterization instrument.

Technical problem 2: the existing hardware devices of the original instrument in the prior patent solution are shared and utilized to the maximum extent, including a mass spectrometer electro quadrupole and a turbo molecular pump-mechanical pump set. Another problem in the commercial ambient pressure mass spectrometer is that both the mass spectrometer electro quadrupole and the turbo molecular pump-mechanical pump set are independent of the original configuration of the ultra-high vacuum characterization instrument, which is equivalent to repurchase the both. Moreover, as a complete machine scheme, the commercial atmospsheric pressure mass spectrometer also has a high device added value, which generally needs ø300,000 to 400,000, and the overall cost is very high.

The in-situ reaction cell interconnected with the ultra-high vacuum characterization instrument is equipped with an independent turbo molecular pump-mechanical pump set (the vacuum limit is 10$^{-9}$ mbar, and the background pressure is generally preserved at 10$^{-8}$ mbar) on the ultra-high vacuum characterization instrument through a connected buffer chamber. The independent turbo molecular pump-mechanical pump set is used to preserve the vacuum level of the corresponding chamber while ensuring the pre-vacuum before the reaction process in the in-situ reaction cell. That is, the reaction gas is not affected by the residual gas in the reactor, and the experimental predetermined ratio is quickly reached. When the in-situ reaction cell is in working status, the gas is input according to the experimental requirements, and the turbo molecular pump-mechanical pump set is segregated from the in-situ reaction cell and is only used to preserve the vacuum level of the buffer chamber. In the prior patent solution adopted by the solution of the present invention, an independent differential pump set needs to be used to adjust the mass spectrometer to achieve a steady sample injection volume under different sampling ambient pressures. Therefore, this turbo molecular pump-mechanical pump set not only meets the requirements of an independent differential pump, but also there is no need to perform any operation on the in-situ cell when the in-situ cell is operating under pressure. Therefore, when the mass spectrometric analysis of the gas in the in-situ reaction cell is required, the solution of the present invention uses this turbo molecular pump-mechanical pump set as an independent differential pump which is necessary for the prior patent solution.

A mass spectrometer electro quadrupole is generally configured on the ultra-high vacuum characterization instrument at a position connecting with a sample chamber, or there is at least a flange position reserved for the mass spectrometer electro quadrupole. Meanwhile, an independent turbo molecular pump-mechanical pump set (the vacuum limit is 10$^{-9}$ mbar, and the background pressure is generally preserved at 10$^{-8}$ mbar) must be configured in the sample chamber. In the prior patent solution adopted by the present invention, the mass spectrometer electro quadrupole and the turbo molecular pump-mechanical pump set are required to complete the composition analysis of sampled gas at about 10$^{-6}$ mbar. Therefore, when the mass spectrometric analysis of the gas in the in-situ reaction cell is required, the solution of the present invention uses this pair of mass spectrometer electro quadrupole and the turbo molecular pump-mechanical pump set to achieve the online gas composition analysis function necessary for the prior patent solution.

The above design directly uses the mass spectrometer electro quadrupole and the turbo molecular pump-mechanical pump set of the ultra-high vacuum characterization instrument in the prior patent solution, eliminating the repeated purchases (accounting for 90% or more of the total hardware cost of the prior patent solution), also saving the space of the control and sampling devices, and further optimize the piping design required for gas sampling.

Technical problem 3: the original operation structure of the ultra-high vacuum characterization instrument is not changed. The original design of the ultra-high vacuum characterization instrument is based on the realization of its characterization function. These structures must remain intact after the new measurement function of the present invention is added, and there must be no changes. Comprehensively taking into account the limitations of the instrument and the technical characteristics of acquiring the gas composition analysis signal, the connection between the mass spectrometer electro quadrupole and the in-situ reaction cell is compatible with this limitation. When the reaction cell is in the working status and is characterized online by mass spectrometry, the reaction gas does not affect the normal operation of the ultra-high vacuum characterization instrument although it is under an ambient pressure or medium-high pressure environment. In the solution of the present invention, the pipelines of the in-situ reaction cell itself are connected to the inlet and exhaust ports outside the instrument to ensure that the reaction proceeds normally in the in-situ reaction cell. The mass spectrometer and the in-situ reaction cell gas output pipeline leading out of the instrument perform sampling through a special stainless steel capillary to analyze the gas composition inside the reaction cell. At this time, the buffer chamber connecting with the turbo molecular pump-mechanical pump set used as the differential pump has the highest pressure of 10$^{-5}$ mbar, and the sample chamber connected to another turbo molecular pump-mechanical pump set has the highest pressure of 10$^{-6}$ mbar. The two chambers are both separated from the rest of the parts of the ultra-high vacuum characterization instrument, and both are pressure transition chambers, which allow direct exposure to an pressure of 1 bar or higher. Therefore, the sampling by mass spectrometry will not affect the overall instrument when the above pressure range is reached.

Technical problem 4: the scope of modification is small, and the modification will not cause the overall shutdown of the instrument and vacuum breakdown. As described above, at present, third-party manufacturers have designed the in-situ reaction cells for quite a few ultra-high vacuum spectroscopy characterization instruments, but generally there are no matched reaction gas composition control scheme and online gas composition analysis. The solution of the present invention utilizes the original hardware configuration of the ultra-high vacuum characterization instrument, i.e., the mass spectrometer electro quadrupole and the turbo molecular pump-mechanical pump set that connect with the sample chamber, and another turbo molecular pump-mechanical pump set fitted to the buffer chamber of the in-situ reaction cell, to achieve the above functions. This belongs to third-party upgrades and modifications performed on the ultra-high vacuum characterization instrument with finalized design. The occurrence of vacuum breakdown or shutdown to the main instrumentation chamber will have a certain impact on the operation of the instrument itself. In the solution of the present invention, the original hardware of the ultra-high vacuum characterization instrument is utilized to the maximum extent, the original ultra-high vacuum characterization instrument involved has a large amount of hardware configurations, and they are more dispersedly distributed on the instrument. Therefore, it is required in the modification scheme that the transition chambers (i.e., the sample chamber and the buffer chamber) are within the allowed range of normal air pressure, and the installation process does not cause the overall shutdown and vacuum breakdown of the instrument.

In view of this problem, the solution of the present invention proposes a pipeline connection design solution for extending and expanding the sampling range of the mass spectrometer electro quadrupole, and an installation solution is obtained accordingly and does not affect the original working status of the instrument. To complete the installation of the solution of the present invention, only the connecting flange between the mass spectrometer electro quadrupole and the sample chamber needs to be changed to a tee flange of the same diameter, the open end is turned off by a gate valve, and one idle flange of the buffer chamber is changed to be adapted to a stainless steel ferrule tube of ¼ inch or more through the flange with the same diameter specification and is turned off by a needle valve. Except for the modification of the two flanges, the connection of all other pipelines can be completed outside the chamber of the ultra-high vacuum characterization instrument. When the mass spectrometer electro quadrupole does not perform online real-time detection on the in-situ reaction cell, the above gate valve and needle valve can be turned off, so that both the buffer chamber and the sample chamber are in the optimal vacuum state.

In summary, the solution of the present invention has the following special designs for the hardware and the requirements to ensure the regular operation of the in-situ reaction cell of the ultra-high vacuum characterization instrument:

1. on the basis of the mass spectrum gas composition sampling and analysis scheme disclosed in the prior patent solution, in view of the special requirements of the instrument in the present invention, the advantage of using the special stainless steel capillary on the pipeline connection of the prior patent solution is utilized to achieve the direct pressure transition between the high pressure in-situ reaction cell and the ultra-high vacuum characterization instrument, and the distance between the capillary and the ultra-high vacuum characterization instrument is minimized through the vacuum connection;

2. the hardware devices of the original instrument is fully utilized, and two turbo molecular pump-mechanical pump sets and a mass spectrometer electro quadrupole are shared with the ultra-high vacuum characterization instrument, which accounts for 90% or more of the hardware cost required by the adopted mass spectrometry gas sampling and analysis scheme disclosed in the prior patent solution;

3. it is a modular design that still retains the original operation structure of the ultra-high vacuum characterization instrument after completing performing the extending and expanding the mass spectrometer electro quadrupole online sampling and detection function to the interconnected in-situ reaction cell, and does not affect the use of any factory functions; and 4. it is also the modular design that the main component of the present invention, i.e., the transition gas path part from the in-situ reaction cell to the mass spectrometer electro quadrupole, is independently installed outside the ultra-high vacuum characterization instrument, and one flange adapter is changed only on each of the two vacuum chambers that allow the pressure to reach 1 bar. During installation, the ultra-high vacuum characterization instrument does not need to be shut down, and the main instrumentation chamber is not subjected to vacuum breakdown.

By means of the above special designs, the present invention has achieved the following effects:

1. when the mass spectrometer electro quadrupole performs gas sampling and composition analysis on the interconnected in-situ reaction cell, its sampling time delay is negligible and the sampling analysis requirements for in-situ analysis, continuity, real-time and high time resolution, are met;

2. under the operation conditions of the ultra-high vacuum characterization instrument, the present invention not only retains the original spectroscopy/imaging function and adds accurate information on the gas composition of the reaction/growth simulated environment obtained during the simultaneous preparation of the in-situ reaction cell, but also, on the basis of the original measurement range of $10^{-10}$ to $10^{-5}$ mbar of the built-in mass spectrometer electro quadrupole, further expands the range covering 1 to 10 bar, which expands the device functions;

3. by means of real-time mass spectrometry analysis, the accurate inspection and control of the steady state composition and partial pressure ratio for operation requirement of are provided for the in-situ reaction cell, and meanwhile, the real-time mass spectrometry analysis with a high time resolution confirms the accuracy of controlling during rapid switching of the upstream gas source used in the experiment;

4. the present invention saves the cost, and not only does the present invention exceed the commercial ambient pressure mass spectrometer in tested technical specifications, but the required cost is less than 10% of the latter;

5. the installation space is minimized; and 6. the expansion and extension of the device functions will not affect the realization of any function of the original ultra-high vacuum characterization instrument, and the installation does not require the main instrumentation chamber to be shut down.

DETAILED DESCRIPTION OF THE EMBODIMENTS

In order to make the present invention more obvious and understandable, the preferred embodiments are described in detail with reference to the drawings as follows.

Figure 2:
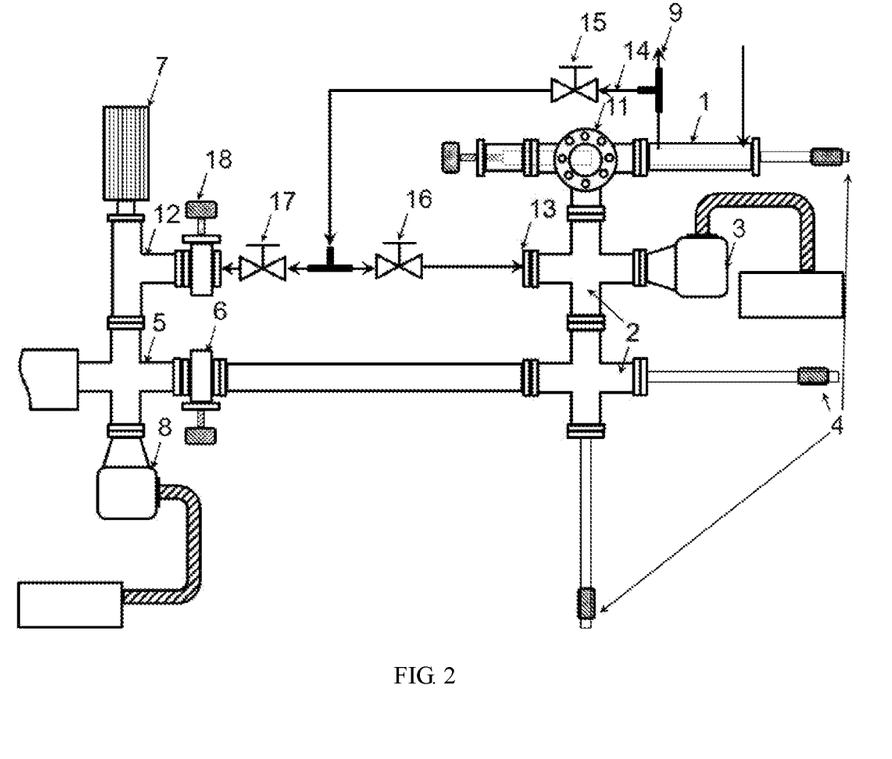
FIG. 2 is a layout diagram of a coupling structure of a UHV characterization instrument-interconnected in-situ reaction cell and a built-in mass spectrometer electro quadrupole according to the present invention.

As shown in FIG. 2, the present invention provides a coupling structure of a UHV characterization instrument-interconnected in-situ reaction cell and a built-in mass spectrometer electro quadrupole. According to the prior patent solution, it is necessary to complete performing sampling from the in-situ reaction cell gas output pipeline 9 by the mass spectrometer electro quadrupole 7. In order to use the original configuration hardware of the ultra-high vacuum characterization instrument to achieve this assembly scheme, first of all, it is necessary to change the original two vacuum flanges of the ultra-high vacuum characterization instrument to flange adapters, which are two vacuum interfaces required for real-time sampling in the prior patent solution. Modification of first flange: the nipple flange 10 that connects the mass spectrometer electro quadrupole 7 and the ultra-high vacuum characterization instrument is changed to the first tee flange 12. Modification of second flange: one idle flange port on the vacuum buffer chamber 2 is changed to the ferrule tube to flange adapter 13 (the one idle flange port on the vacuum buffer chamber 2 may also be adapted to a ferrule tube having a larger diameter than that of this preferred embodiments). The remaining pipeline connections can all be completed outside the ultra-high vacuum characterization instrument. The stainless steel capillary 14 is connected to the in-situ reaction cell gas output pipeline 9 to form a sampling port, and the sampling port is protected by the 1/16" ball valve 15. A sampling gasline is divided into two gas paths, wherein, one gas path enters the vacuum buffer chamber 2 by connecting with the ferrule tube to flange adapter 13 through the bonnet needle valve 16 (low flow control ratio) as a differential gas path in the prior patent solution; and the other gas path enters the mass spectrometer electro quadrupole 7 by connecting with the first tee flange 12 through the high precision metering needle valve 17 (high flow control ratio) for analysis and sampling.

When the mass spectrometer electro quadrupole 7 does not need to sample the independent in-situ reaction cell 1, the second gate valve 18 is turned off, and the sample chamber 5 and a main chamber of the ultra-high vacuum characterization instrument connected with the sample chamber 5 are completely unaffected by the expanded and extended sampling part. Meanwhile, the 1/16" ball valve 15 is turned off, and the vacuum of the expanded and extended sampling part newly added is preserved by the vacuum buffer chamber 2. Moreover, the vacuum level of the vacuum buffer chamber 2 itself will not be affected.

In the solution of FIG. 2, by means of the pipeline design of the present invention, the existing main hardware devices, i.e. the mass spectrometer electro quadrupole 7, the first turbo molecular pump-mechanical pump set 3 and the second turbo molecular pump-mechanical pump set 8 form a topological structure relationship completely consistent with the prior patent solution, so that the online analysis of the gas composition during the preparation process in the independent in-situ reaction cell 1 is realized by means of the in-situ reaction cell gas output pipeline 9 through these hardware devices. Specifically, the first turbo molecular pump-mechanical pump set 3 actually plays the role of the differential pump set in the prior patent solution. When the pressure of the independent in-situ reaction cell 1 is relatively high, the split flow of the sampled gas flow to the first turbo molecular pump-mechanical pump set 3 can be increased by adjusting the bonnet needle valve 16, and the high precision metering needle valve 17 is cooperatively adjusted, so that even if the independent in-situ reaction cell 1 is at the maximum pressure of 10 bar, the pressure next to the mass spectrometer electro quadrupole 7 will be stably controlled at $10^{-6}$ mbar or less. This ensures that any ultra-high vacuum characterization instrument is quickly restored to the background pressure of $10^{-10}$ mbar after this characterization operation is completed.

If the vacuum buffer chamber 2 does not have the idle flange, the flange 11 with a viewport for monitoring sample transfer may be changed to the second tee flange of the same diameter, the flange with the viewport for monitoring sample transfer is retained in the straight-through direction, and one idle flange port is purposingly added in the non-straight-through direction of the second tee flange which is newly added to complete the modification of the above second flange port. In order to cooperate with the vacuum interconnecting transfer device 4 to transfer a sample in the vacuum buffer chamber 2, a plurality of observation windows must be equipped, and thus the position of the ferrule tube to flange adapter 13 is guaranteed.

The above ferrule tube to flange adapter 13 is required to be adapted to a stainless steel pipeline with an outer diameter of 1/4 inch or larger.

The following is an example of upgrading and modifying an XPS analysis device equipped with a vacuum interconnected in-situ reaction cell to further illustrate the present invention.

Figure 3:
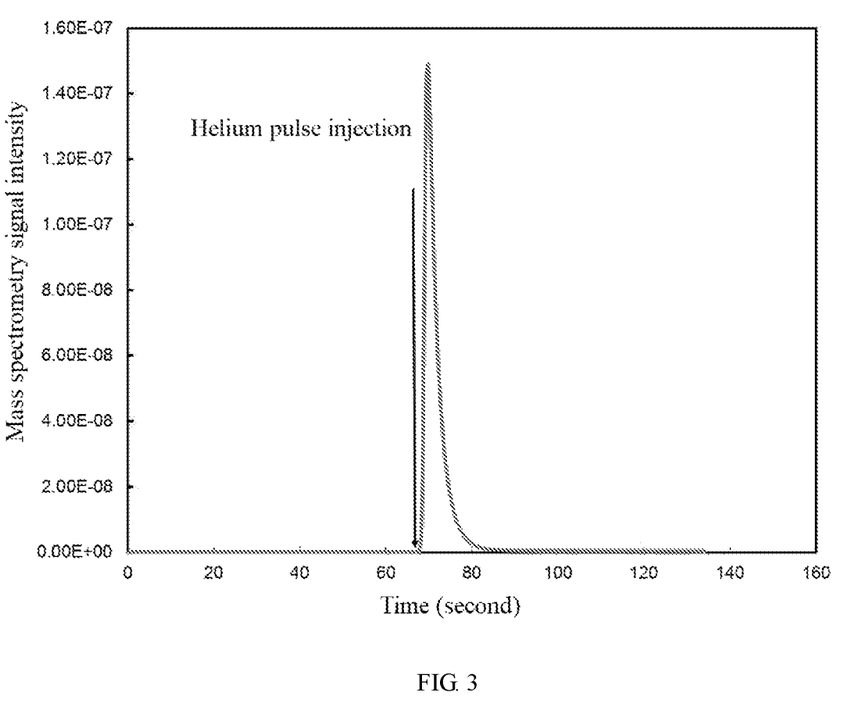
FIG. 3 is an example of a sampling signal of the mass spectrometer electro quadrupole.

The XPS analysis device is purchased from ThermoFisher of model ESCA 250Xi; both the vacuum interconnection device and the independent in-situ reaction cell 1 are purchased from Fermi Instruments, wherein the model of the independent in-situ reaction cell 1 is HPGC 300; the model of the mass spectrometer electro quadrupole 7 is SRS300; and both the models of two turbo molecular pump-mechanical pump sets are Edward. Specifically, because the molecular pump is configured according to the ultra-high vacuum characterization instrument, the pumping speed of the molecular pumps are greater than 200 L, which is much higher than the pumping speed required by the prior patent solution. This is the normal situation of the configuration of the ultra-high vacuum characterization instrument, and thus the sampling control result obtained by the present invention patent in a practical application is better than the embodiment of the prior patent solution. In the implementation of mass spectrometry signal acquisition, the pressure of the sample chamber 5 is always stabilized at a set value of $10^{-6}$ mbar or less, while a stable and clear signal for the gas composition with a content of 1 ppm still exists under the condition of $10^{-8}$ mbar. FIG. 3 shows a sampling signal of a very short helium pulse next to the in-situ reaction cell gas output pipeline 9 obtained by the mass spectrometer electro quadrupole 7, and there is no obvious time delay (which is far less than the sampling interval of the mass spectrometer electro quadrupole) between its corresponding time and the occurrence time of the helium pulse. In an actual operation, by adjusting the flow ratio of the sampling signal through the bonnet needle valve 16 and the high precision metering needle valve 17, the mass spectrometer electro quadrupole 7 has a sensitive signal response to the independent in-situ reaction cell 1 under a vacuum condition of 0.01 bar to a medium-high pressure condition of 10 bar, which exceeds the design requirement of the pressure of 1 to 10 bar in the sampling area. After the mass spectrometer electro quadrupole 7 completes performing sampling from the independent in-situ reaction cell 1, the 1/16" ball valve 15 and the second gate valve 18 are separately turned off, and the vacuum buffer chamber 2 and the sample chamber 5 are restored to an optimal vacuum background within a few minutes.

In the present embodiment, the connection between all the hardware devices and the ultra-high vacuum characterization instrument conforms to the structure of FIG. 1.

In the connection of the expanded and extended sampling pipelines of the mass spectrometer electro quadrupole 7, the 1/16" ball valve 15, the bonnet needle valve 16, the high precision metering needle valve 17 and the pipeline fittings connected to them all employ domestic valves, which are mainly purchased from Shanghai X-tec Fluid Technology Co., Ltd. The added gate valve is purchased from the VAT brand.

Preferably, in installation, the distance between the capillary and the X-ray characterization instrument is minimized, reducing the gas delay time in the pipeline, and this delayed time relative to the dead volume of the in-situ reaction cell is negligible.

Preferably, the stainless steel capillary 14 performs a sampling on the in-situ reaction cell gas output pipeline 9 and is then directly adapted to a stainless steel pipeline with an amplified outer diameter of 1/4 inch or larger, so as to achieve the maximum vacuum flow conductance. That is, the connection with the mass spectrometer instrument achieves zero time delay.

Preferably, in FIG. 2, acting as the pipeline fittings of the mass spectrometer electro quadrupole 7 to perform direct sampling on the independent in-situ reaction cell 1, the mass spectrometer electro quadrupole 7, the ferrule tube to flange adapter 13, the special stainless steel capillary pipeline 14, the 1/16" ball valve 15, the bonnet needle valve 16, the high precision metering needle valve 17 and the second gate valve 18 all connect with each other to form an installation module, facilitating the disassembly and experimental operations. The entire installation process does not affect the overall operation of the ultra-high vacuum characterization instrument and does not cause vacuum breakdown to the main instrumentation chamber.

Preferably, by means of the modular installation design, the newly added sampling expanded and extended functional module of the mass spectrometer electro quadrupole 7 connects with the chambers of the original ultra-high vacuum characterization instrument only through the first tee flange 12 and the ferrule tube to flange adapter 13. When the mass spectrometer electro quadrupole 7 does not perform the expanded and extended sampling function for the independent in-situ reaction cell 1, the 1/16" ball valve 15 and the second gate valve 18 are simply separately turned off, so that the vacuum buffer chamber 2 and the sample chamber 5 are restored to the work structure before modification, and the newly added sampling expanded and extended functional module is also under the protection of ultra-high vacuum.

Preferably, on the basis of the prior patent solution, the bonnet needle valve 16 and the high precision metering needle valve 17 are used to regulate the split flow of the sampled gas flow. In combination with the advantage of the large pumping speed and the good vacuum background owned by the molecular pump of the ultra-high vacuum characterization instrument, it is realized that when the mass spectrometer electro quadrupole 7 performs direct sampling from the independent in-situ reaction cell 1 (1 to 10 bar), the pressure of the sample chamber 5 is always stabilized at the set value of $10^{-6}$ mbar or less, and up to $10^{-8}$ mbar there is still a stable and clear signal for the gas component with a concentration of 1 ppm.

Preferably, by means of the pipeline design of the present invention, a direct vacuum transition from the independent in-situ reaction cell 1 (1 to 10 bar) to the mass spectrometer electro quadrupole 7 ($10^{-8}$-$10^{-6}$ mbar) is realized. After the mass spectrometer electro quadrupole 7 completes direct sampling from the independent in-situ reaction cell 1, the vacuum buffer chamber 2 and the sample chamber 5 are restored to the optimal vacuum background within a few minutes.

Preferably, by means of the pipeline design, the important hardware devices of the original ultra-high vacuum characterization instrument is fully utilized, including the mass spectrometer electro quadrupole 7, the second turbo molecular pump-mechanical pump set 8 and the first turbo molecular pump-mechanical pump set 3, which account for 90% or more of the hardware cost of the prior patent solution, greatly saving the device costs.

In summary, based on the characteristics of the devices, the present invention provides an online mass spectrometry sampling and analysis function for the in-situ reaction cell of the ultra-high vacuum characterization instrument at an extremely low cost, expands the analysis capability of the built-in mass spectrometer electro quadrupole of the ultra-high vacuum characterization instrument to a gas reaction environment of 1 to 10 bar, and completely covers the accuracy requirements corresponding to pressure and gas composition range of the in-situ reaction cell of the ultra-high vacuum characterization instrument. The sampling part meets: (i) the requirement of real-time sampling, no time delay, and sensitive response to the acquisition of trace pulses; (ii) the pressure range of the in-situ reaction cell of the ultra-high vacuum characterization instrument, that is, the upper limit requirement of the medium-high pressure, and (iii) the original operation requirements of the ultra-high vacuum characterization instrument without changing its basic structure when the extension and expansion function is implemented. Moreover, the sampling part is easy to install, small in volume, clear in module design, and does not affect the use of other functions of the original instrument and personnel action, which is also helpful for monitoring other similar related environments or fundamental research on chemical engineering reaction.

What is claimed is:

1. A coupling structure of a UHV characterization instrument-interconnected in-situ reaction cell and a built-in mass spectrometer electro quadrupole, comprising a segregated in-situ reaction cell, wherein, an in-situ reaction cell gas output pipeline is connected to the segregated in-situ reaction cell, and the segregated in-situ reaction cell connects with a vacuum buffer chamber; a sample is transferred to a sample chamber of a UHV characterization instrument through a vacuum interconnecting transfer device, and the vacuum buffer chamber is separated from the sample chamber by a $1^{st}$ gate valve; the sample chamber connects with a mass spectrometer electro quadrupole, and a turbo molecular pump-mechanical pump set is configured on the sample chamber; wherein, a first end of a stainless steel capillary pipeline is connected to the in-situ reaction cell gas output pipeline, and a second end of the stainless steel capillary pipeline is a sampling port; a sampling gas flowing out of the sampling port is divided into two gas paths, wherein, a first gas path of the sampling gas enters the vacuum buffer chamber through a first valve with a low flow control ratio, and a second gas path of the sampling gas enters the mass spectrometer electro quadrupole through a second valve with a high flow control ratio.

2. The coupling structure of the UHV characterization instrument-interconnected in-situ reaction cell and the built-in mass spectrometer electro quadrupole according to claim 1, wherein, a flange is connected between the vacuum buffer chamber and the segregated in-situ reaction cell, and the flange is provided with a viewport for monitoring sample transfer; and wherein when the vacuum buffer chamber comprises an idle flange port, the idle flange port is changed to a ferrule tube to flange adapter; and when the vacuum buffer chamber does not comprises the idle flange port, the above flange is by employing a $2^{nd}$ tee flange, the flange with the viewport for monitoring sample transfer is provided in a straight-through direction of the $2^{nd}$ tee flange, the flange port in a non-straight-through direction of the $2^{nd}$ tee flange is the idle flange port, and the idle flange port is changed to the ferrule tube to flange adapter; and wherein the first gas path of the sampling gas enters the vacuum buffer chamber via the ferrule tube to flange adapter through the first valve with the low flow control ratio.

3. The coupling structure of the UHV characterization instrument-interconnected in-situ reaction cell and the built-in mass spectrometer electro quadrupole according to claim 2, wherein, the sampling port of the stainless steel capillary pipeline is connected to a protection ball valve.

4. The coupling structure of the UHV characterization instrument-interconnected in-situ reaction cell and the built-in mass spectrometer electro quadrupole according to claim 3, further comprising a $1^{st}$ tee flange, three flange ports of the $1^{st}$ tee flange are connected to the sample chamber, the mass spectrometer electro quadrupole and the second valve with the high flow control ratio, respectively.

5. The coupling structure of the UHV characterization instrument-interconnected in-situ reaction cell and the built-in mass spectrometer electro quadrupole according to claim 4, wherein, one of the three flange ports of the $1^{st}$ tee flange is connected to the second valve with the high flow control ratio, and the $1^{st}$ tee flange is separated from the second valve with the high flow control ratio by a $2^{nd}$ gate valve.

6. The coupling structure of the UHV characterization instrument-interconnected in-situ reaction cell and the built-in mass spectrometer electro quadrupole according to claim 5, wherein, the ferrule tube to flange adapter, the stainless steel capillary pipeline, the protection ball valve, the first valve with the low flow control ratio, the second valve with the high flow control ratio, and the second gate valve connect with each other to form an installation module.

7. The coupling structure of the UHV characterization instrument-interconnected in-situ reaction cell and the built-in mass spectrometer electro quadrupole according to claim 1, wherein, the first valve with the low flow control ratio comprises a bonnet needle valve.

8. The coupling structure of the UHV characterization instrument-interconnected in-situ reaction cell and the built-in mass spectrometer electro quadrupole according to claim 1, wherein, the second valve with the high flow control ratio comprises a high precision metering needle valve.

9. The coupling structure of the UHV characterization instrument-interconnected in-situ reaction cell and the built-in mass spectrometer electro quadrupole according to claim 1, wherein, the stainless steel capillary pipeline performs a sampling on the in-situ reaction cell gas output pipeline, and is then directly adapted to a stainless steel pipeline with an amplified outer diameter, wherein the amplified outer diameter of the stainless steel pipeline is equal to or larger than of ¼ inch.

* * * * *